(12) United States Patent
Vican et al.

(10) Patent No.: US 7,810,874 B2
(45) Date of Patent: Oct. 12, 2010

(54) INSTRUMENT PANEL SUPPORT STRUCTURE

(75) Inventors: Rudy M. Vican, Oxford, MI (US); Roy M. Meier, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/353,427

(22) Filed: Jan. 14, 2009

(65) Prior Publication Data
US 2010/0176262 A1    Jul. 15, 2010

(51) Int. Cl.
*B62D 25/14* (2006.01)
(52) U.S. Cl. .................................. 296/193.02; 296/72
(58) Field of Classification Search ............ 296/193.02, 296/70, 72, 203.02; 180/90
See application file for complete search history.

(56) References Cited

U.S. PATENT DOCUMENTS

| | | | | |
|---|---|---|---|---|
| 5,564,769 A | * | 10/1996 | Deneau et al. ................ 296/72 |
| 5,931,520 A | * | 8/1999 | Seksaria et al. ............... 296/70 |
| 6,073,987 A | * | 6/2000 | Lindberg et al. .............. 296/70 |
| 6,237,956 B1 | * | 5/2001 | Haba et al. ................... 280/779 |
| 6,481,786 B1 | * | 11/2002 | Kim ...................... 296/203.02 |
| 6,488,330 B2 | * | 12/2002 | Hedderly .................... 296/192 |
| 6,581,967 B1 | * | 6/2003 | Logan et al. ................. 280/779 |
| 2008/0048470 A1 | | 2/2008 | Vican | |

* cited by examiner

*Primary Examiner*—Glenn Dayoan
*Assistant Examiner*—Gregory Blankenship
(74) *Attorney, Agent, or Firm*—Quinn Law Group, PLLC

(57) ABSTRACT

An instrument panel support structure is configured for locating an instrument panel assembly in a fore/aft direction and an up/down direction within a passenger compartment of a vehicle. The support structure includes a lateral support bracket and an end bracket. The lateral support bracket is attached to a body panel of the vehicle and presents a support surface that defines an up/down datum feature and includes a rear edge that presents a fore/aft datum feature. The end bracket is attached to an end of the instrument panel assembly. The end bracket presents a first edge and a projection that extends from the first edge. The first edge abuts the support surface of the up/down datum feature to locate the instrument panel assembly in the up/down direction. The projection abuts the rear edge of the fore/aft datum feature to locate the instrument panel assembly in the fore/aft direction.

17 Claims, 4 Drawing Sheets

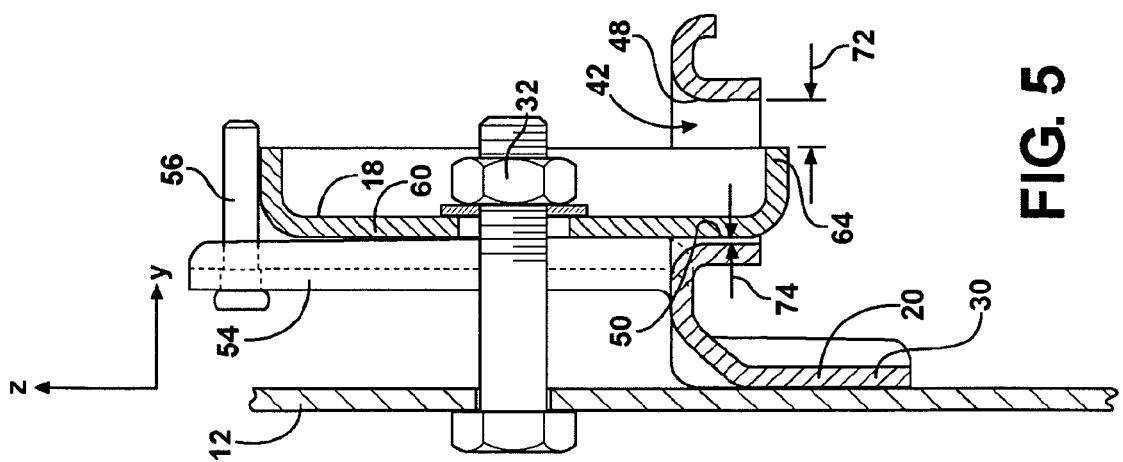
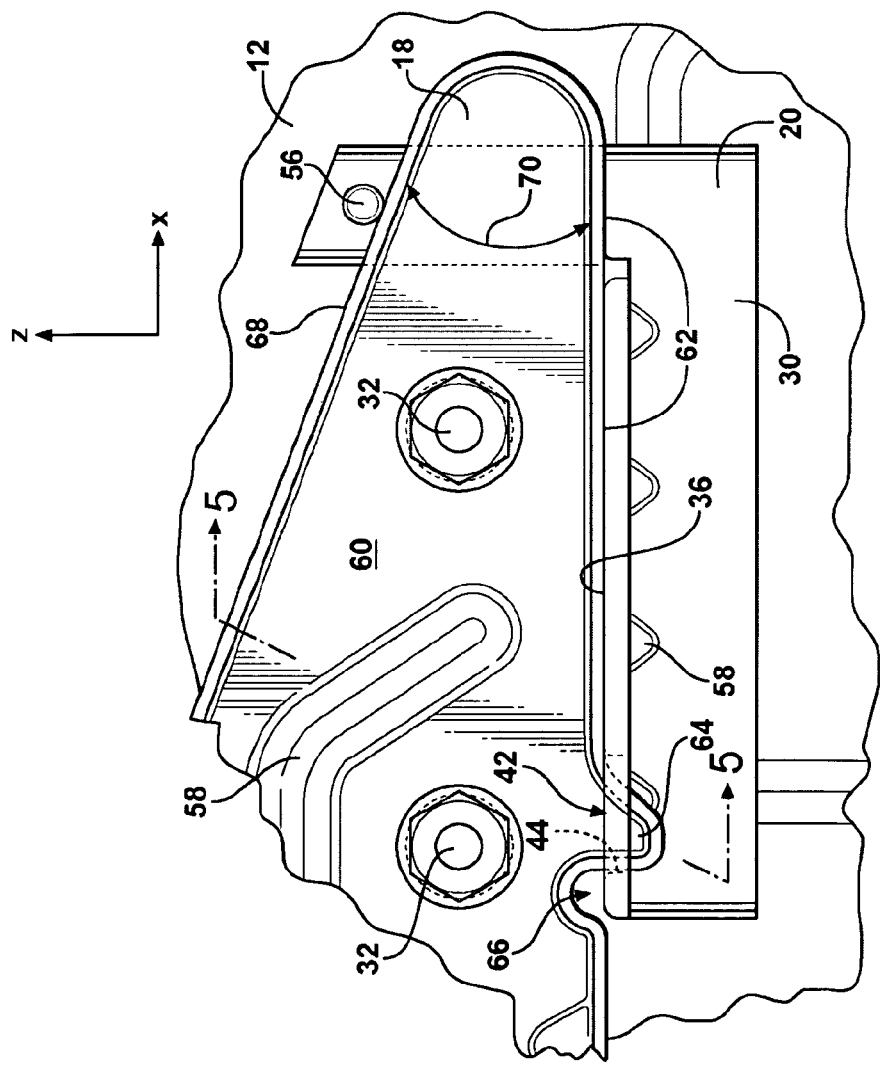

INSTRUMENT PANEL SUPPORT STRUCTURE

TECHNICAL FIELD

The present invention relates to a vehicular instrument panel support structure.

BACKGROUND OF THE INVENTION

Instrument panels, alternately referred to as dashboards, are situated within a passenger compartment of a vehicle and positioned facing the vehicle occupants, primarily a driver/operator, for easy readability and accessibility of the various instruments housed within the instrument panel. Common instrumentation found in a vehicle passenger compartment includes, for example, speedometers, odometers, tachometers, fuel gauges, and indicator lamps. An instrument panel may also house such other non-metering devices as air bags, glove compartments or boxes, radios, CD/DVD/cassette players, navigation screens, clocks, ashtrays, speakers, climate controls, and air vents. Instrument panels are typically formed with protective padding and other external trim material which is contoured and styled to provide a fully-assembled instrument panel with an aesthetically-pleasing appearance. Instrument gauges and meters are typically faced with a transparent material for protection from damage, dirt, and/or tampering.

Since the aforementioned instruments and devices may contribute a substantial amount of combined weight and mass to the vehicle, the instrument panel is therefore supported by a substantially rigid substructure positioned behind and beneath the visible portions of the panel. Instrument panel support structures are often constructed from stamped and welded steel sheet metal assemblies and may include a plurality of supporting brackets or braces having a sufficient amount of surface area to allow the support structure to be attached to the vehicle and the instruments and other devices to be securely fastened within the panel.

SUMMARY OF THE INVENTION

An instrument panel support structure is configured to locate an instrument panel assembly in a fore/aft direction and an up/down direction within a passenger compartment of a vehicle. The support structure includes a lateral support bracket and an end bracket. The lateral support bracket is configured for attachment to a body panel of the vehicle. The lateral support bracket presents a support surface defining an up/down datum feature and includes a rear edge that presents a fore/aft datum feature. The end bracket is configured for attachment to an end of the instrument panel assembly. The end bracket presents a first edge and a projection that extends from the first edge. The first edge of the end bracket is configured to abut the up/down datum feature of the lateral support bracket to locate the instrument panel assembly in the up/down direction. The projection of the end bracket is configured to abut the fore/aft datum feature of the lateral support bracket to locate the instrument panel assembly in the fore/aft direction.

A mounting configuration within a passenger compartment of a vehicle includes a pair of body panels, an instrument panel assembly, and an instrument panel support structure. The pair of body panels are disposed in spaced relationship in a lateral direction across the passenger compartment of the vehicle. The instrument panel assembly extends along a lateral axis between opposing ends. The instrument panel support structure is configured to locate the instrument panel assembly in a fore/aft direction and an up/down direction within the passenger compartment of the vehicle. The support structure includes a pair of lateral support brackets and an end bracket. Each of the pair of lateral support brackets is configured for attachment to a respective one of the pair of body panels of the vehicle. Each of the lateral support brackets presents a support surface defining an up/down datum feature and includes a rear edge that presents a fore/aft datum feature. Each of the pair of end brackets is configured for attachment to a respective one of the ends of the instrument panel assembly. Each of the end brackets presents a first edge and a projection extending from the first edge. The first edge of each end bracket is configured to abut the up/down datum feature of the respective lateral support bracket to locate the instrument panel assembly in the up/down direction. The projection of each end bracket is configured to abut the fore/aft datum feature of the respective lateral support bracket to locate the instrument panel assembly in the fore/aft direction.

A method of locating an instrument panel assembly in a fore/aft direction and an up/down direction within a passenger compartment of a vehicle includes providing a lateral support bracket presenting a support surface defining an up/down datum feature and including a rear edge presenting a fore/aft datum feature. An end bracket is provided at an end of the instrument panel assembly. A first edge of the bracket is abutted with the support surface of the up/down datum feature to locate the instrument panel assembly in the up/down direction. A projection of the bracket is abutted with the rear edge of the fore/aft datum feature to locate the instrument panel assembly in the fore/aft direction.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic side view of the instrument panel support structure of FIG. 1; and FIG. 5 is a schematic cross-sectional side view of the instrument panel support structure of FIG. 4, taken along line 5-5.

DESCRIPTION OF THE PREFERRED EMBODIMENTS

Figure 1:
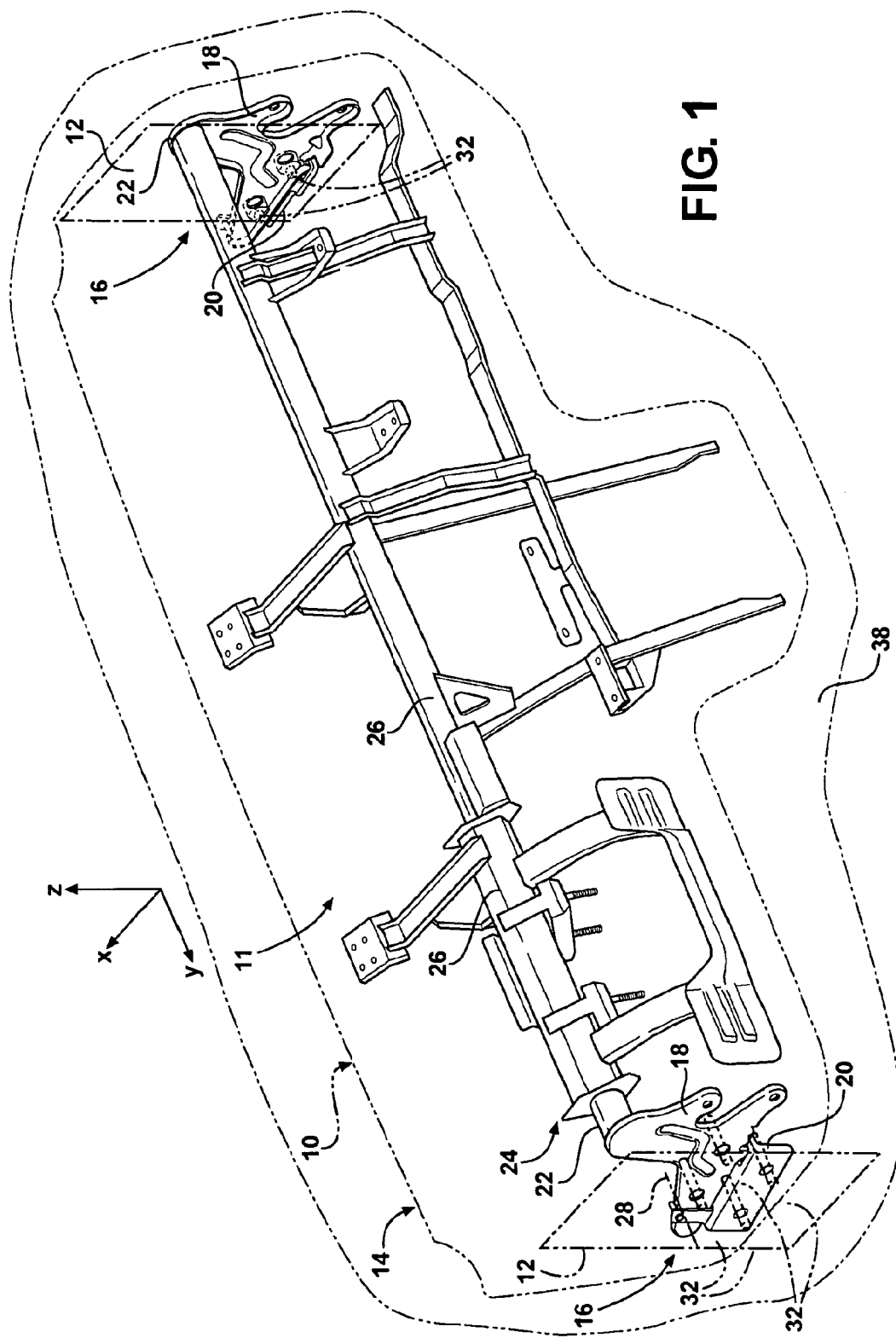
FIG. 1 is a schematic perspective view of an instrument panel support structure having end brackets extending from opposing ends of a tubular support frame and a pair of lateral support brackets disposed within a passenger compartment.

Referring to the drawings, wherein like reference numbers refer to like components, FIG. 1 shows an instrument panel assembly (IP assembly 10) at 10. The IP assembly 10 is configured to be mounted to a plurality of body panels 12 as part of a mounting configuration 11 within a passenger compartment 14 of a vehicle (not shown). An instrument panel support structure 16 is configured to position or locate the IP assembly 10 on an x, y, and z coordinate system within the passenger compartment 14 of the vehicle. More specifically, the support structure 16 locates the IP assembly 10 in a fore/aft direction (x) and an up/down direction (z) within the passenger compartment 14 of the vehicle. The support structure 16 includes an end bracket 18 and a lateral support bracket 20. The end bracket 18 is configured to extend from respective ends 22 of the IP assembly 10. The lateral support bracket 20 is configured to extend from respective body panels 12. The body panels 12 may be a pair of hinge pillar panels 12 that are disposed in spaced and generally parallel relationship to one another across the passenger compartment 14, in the lateral direction (y).

Referring again to FIG. 1, the IP assembly 10 includes a tubular support frame 24 that extends between, and is mounted to, the hinge pillar panels 12 at the opposing ends 22 thereof. The tubular support frame 24 may include a main tube 26 that extends along a lateral axis 28. When the IP assembly 10 is located within the passenger compartment 14 of the vehicle, the lateral axis 28 extends in the lateral direction y and extends in generally perpendicular relationship to each of the hinge pillar panels 12. The tubular support frame 24 may also include a plurality of other tubes, plates, brackets, and the like. The end bracket 18 is disposed at each end 22 of the main tube 26, such that the end bracket 18 extends in generally perpendicular relationship to the lateral axis 28. The end bracket 18 may be attached to the respective ends 22 of the main tube 26 frame via fastening, welding, and the like. At least a portion of each end bracket 18 is disposed on the lateral axis 28. The end bracket 18 will be described in more detail below.

Figure 2:
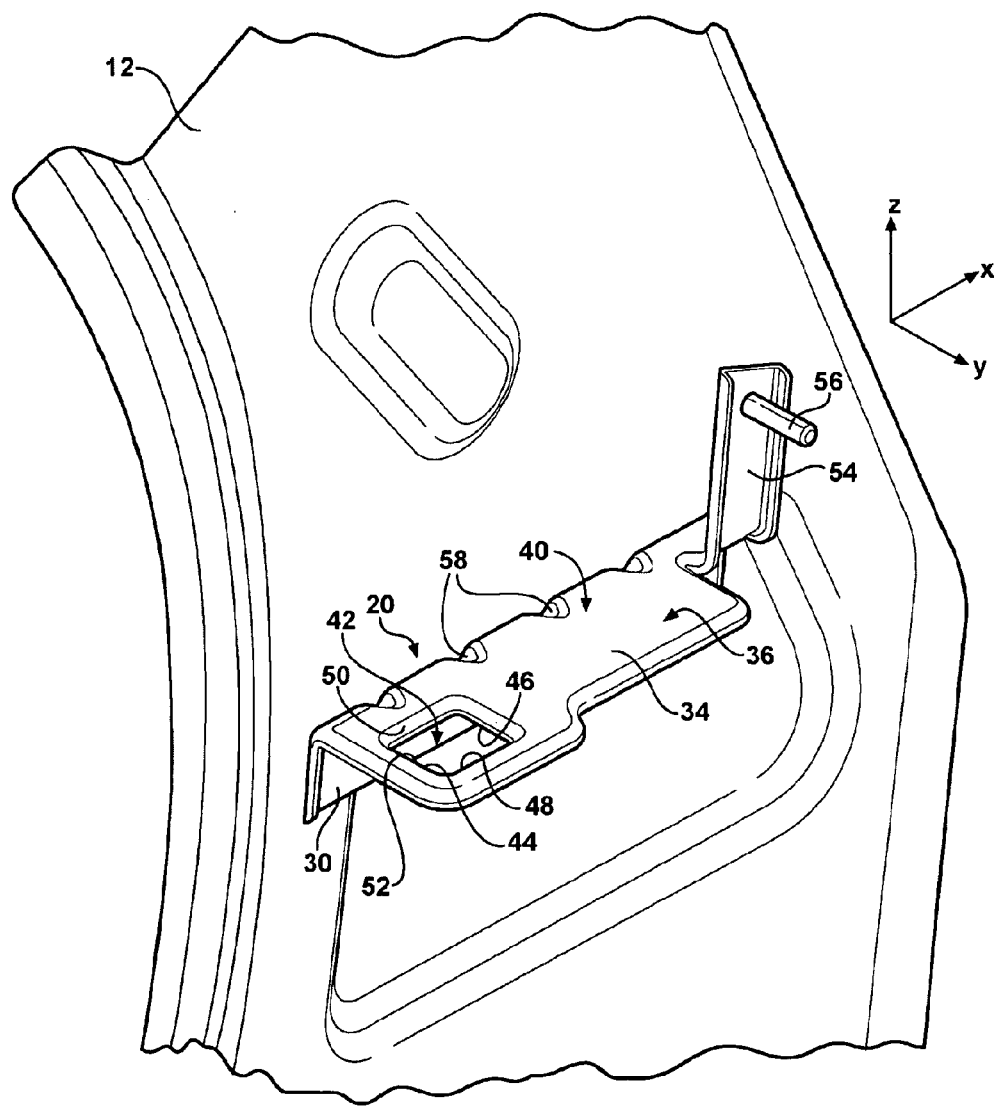
FIG. 2 is a schematic view of the lateral support bracket of the instrument panel support structure of FIG. 1 attached to a body panel.

The lateral support bracket 20 is attached to each of the hinge pillar panels 12 via fastening, welding, and the like. Referring to FIGS. 2-5, the lateral support brackets 20 are configured to engage a respective one of the end brackets 18 to locate and support the IP assembly 10 in the fore/aft direction x and up/down direction z within the passenger compartment 14 of the vehicle. The lateral support brackets 20 may be formed by stamping or any other process known to those skilled in the art. Each lateral support bracket 20 includes a wall 30 that is configured to be attached to the respective hinge pillar panel 12. The lateral support brackets 20 may be attached to the respective hinge pillar panels 12 with fasteners 32 that extend in the generally lateral direction y through the hinge pillar panels 12, as shown in FIG. 1. Referring to FIG. 2, a shelf 34 extends generally perpendicularly from the wall 30, in the lateral direction y, to form a generally L-shaped lateral support bracket 20. When the lateral support bracket 20 is attached to the hinge pillar panel 12, the shelf 34 presents a support surface 36 that faces in a generally upward direction, i.e., away from a floor 38 of the vehicle. The support surface 36 provides an up/down datum feature 40 to locate the IP assembly 10 in the up/down direction z within the passenger compartment 14 of the vehicle. The shelf 34 defines a locating hole 42 that is configured to receive a portion of the respective end bracket 18, as described in more detail below. The locating hole 42 may be bounded by a rear edge 44, a front edge 46, an inner edge 48, and an outer edge 50, as shown in FIG. 2. The front edge 46 is spaced from the rear edge 44 and the inner edge 48 is spaced from the outer edge 50 with the locating hole 42 defined between the respective edges 44, 46, 48, 50. The rear edge 44 extends in the lateral direction y and provides a fore/aft datum feature 52 to locate the IP assembly 10 in the fore/aft direction x within the passenger compartment 14 of the vehicle. Additionally, the lateral support bracket 20 may include a finger 54 that extends generally perpendicularly from the shelf 34. The finger 54 is spaced from the locating hole 42. A post 56 extends from the finger 54, away from the hinge pillar panel 12. Referring to FIG. 4, the post 56 is in spaced and generally parallel relationship to the support surface 36 of the shelf 34. The post 56 and the shelf 34 may be configured to engage a portion of the respective end bracket 18 therebetween, as described in more detail below. The lateral support bracket 20 may also define one or more structural ribs 58 for adding strength and rigidity thereto, as shown in FIG. 2.

Figure 3:
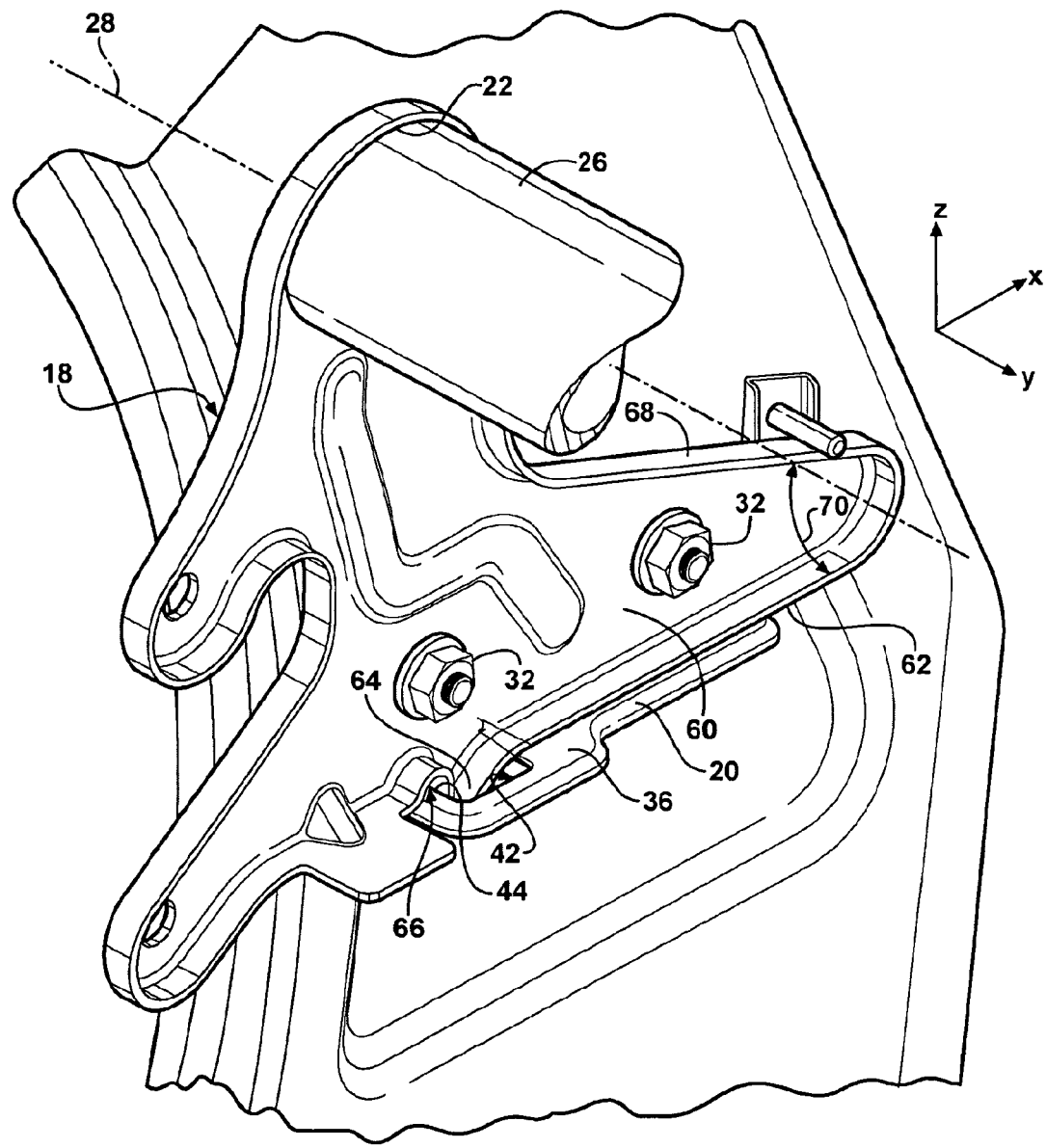
FIG. 3 is a schematic perspective view of the support bracket of FIG. 1 with an end bracket in engagement with the support bracket and attached to the body panel.

Each end bracket 18 may be formed by stamping or any other process known to those skilled in the art. Each end bracket 18 includes a plate portion 60. Referring to FIGS. 1 and 3, the plate portion 60 may extend generally in perpendicular relationship from the respective end 22 of the main tube 26 such that the lateral axis 28 extends through the plate portion 60 of each end bracket 18. The plate portion 60 includes a first edge 62 that is linear, as shown in FIGS. 3 and 4. A projection 64 extends from the first edge 62, in relatively the same plane as the plate portion 60 and the first edge 62. A groove 66 may be defined in the first edge 62 of the plate portion 60, adjacent the projection 64. The plate portion 60 also includes a second edge 68 that extends at an angle 70 relative to the first side that is acute. The end bracket 18 may also define one or more structural ribs 58 for adding strength and rigidity thereto.

When the IP assembly 10 is inserted into the passenger compartment 14 of the vehicle, the IP assembly 10 is moved forward in the fore/aft direction x within the passenger compartment 14 until the first edge 62 of the end brackets 18 contact the support surface 36 of the shelf 34 at the up/down datum feature 40 to locate the end brackets 18 and the IP assembly 10 in the up/down direction within the passenger compartment 14 of the vehicle, as shown in FIG. 4. At the same time, the IP assembly 10 may be moved such that the projections 64 of the end brackets 18 are disposed within the locating holes 42 of the respective lateral support brackets 20 and abut the respective rear edges 44, as shown in FIGS. 3 and 4. When each projection 64 is disposed within the respective locating hole 42, the groove 66 ensures adequate clearance between the shelf 34 and the end bracket 18 to prevent binding between the end bracket 18 and the lateral support bracket 20. The projection 64 abuts the front edge 46 of the locating hole 42 at the fore/aft datum feature 52 to locate the respective end bracket 18 and the IP assembly 10 in the fore/aft direction x within the passenger compartment 14 of the vehicle, as shown in FIG. 4.

Referring to FIG. 5, when the projection 64 is disposed in the locating hole 42, a first gap 72 may be defined between the end bracket 18 and the inner edge 48 of the locating hole 42 and a second gap 74 may be defined between the end bracket 18 and the outer edge 50 of the locating hole 42. The gaps 72, 74 allow for any variation in the lateral direction y (i.e., cross-vehicle variation) to prevent binding between the end brackets 18 and the respective lateral support brackets 20 upon assembly.

In addition, the second edge 68 of the end bracket 18 may engage or touch the post 56 of the respective lateral support bracket 20 such that a portion of the end bracket 18 is disposed between the post 56 and the shelf 34 of the lateral support bracket 20, as shown in FIGS. 3-5. The posts 56 may function to keep the end brackets 18 in contact with the lateral support brackets 20 until the IP assembly 10 is secured to the vehicle.

While the best modes for carrying out the invention have been described in detail, those familiar with the art to which this invention relates will recognize various alternative designs and embodiments for practicing the invention within the scope of the appended claims.

The invention claimed is:

1. An instrument panel support structure configured for locating an instrument panel assembly in a fore/aft direction and an up/down direction within a passenger compartment of a vehicle, said support structure comprising:
   a lateral support bracket configured for attachment to a body panel of the vehicle;
   wherein said lateral support bracket presents a support surface defining an up/down datum feature;
   wherein said lateral support bracket includes a rear edge presenting a fore/aft datum feature;
   an end bracket configured for attachment to an end of the instrument panel assembly;
   said end bracket presenting a first edge and a projection extending from said first edge;
   wherein said first edge of said end bracket is configured to abut said up/down datum feature of said lateral support bracket to locate the instrument panel assembly in the up/down direction and said projection of said end bracket is configured to abut said fore/aft datum feature of said lateral support bracket to locate the instrument panel assembly in the fore/aft direction; and
   wherein said end bracket further includes a plate portion and said first edge extends along said plate portion, and said first edge of said plate portion defines a groove with said projection extending adjacent said groove.

2. A support structure, as set forth in claim 1, wherein said first edge is generally linear.

3. A support structure, as set forth in claim 1, wherein said support surface is generally planar.

4. A support structure, as set forth in claim 1, wherein said lateral support bracket includes a wall configured for attachment to the body panel of the vehicle and said shelf extends generally perpendicularly from said wall such that said lateral support bracket is generally L-shaped.

5. A support structure, as set forth in claim 4, wherein said shelf defines a locating hole bounded by said rear edge, a front edge, an inner edge, and an outer edge;
   wherein said rear edge extends in spaced relationship to said front edge and said inner edge extends in spaced relationship to said outer edge.

6. A support structure, as set forth in claim 5, wherein said lateral support bracket further includes:
   a finger extending generally perpendicularly from said shelf in spaced relationship to said locating hole; and
   a post extending from said finger in spaced and generally parallel relationship to said shelf;
   wherein said post and said shelf are configured to engage a portion of said end bracket therebetween.

7. A support structure, as set forth in claim 6, wherein said end bracket further includes a second edge extending at an angle relative to said first edge such that said first side is configured to abut said support surface and said second side is configured to abut said post to retain a portion of said end bracket therebetween.

8. A support structure, as set forth in claim 1, wherein said lateral support bracket defines at least one structural rib for providing rigidity thereto.

9. A support structure, as set forth in claim 1, wherein said end bracket defines at least one structural rib for providing rigidity thereto.

10. A support structure, as set forth in claim 5, wherein said projection is configured to define a first gap between said projection and said inner edge of said locating hole and a second gap between said projection and said outer edge of said locating hole when said projection is disposed in said locating hole and abuts said rear edge.

11. A mounting configuration within a passenger compartment, said mounting configuration comprising:
    a pair of body panels disposed in spaced relationship in a lateral direction across the passenger compartment;
    an instrument panel assembly extending along a lateral axis and having opposing ends;
    wherein said instrument panel includes a tubular support frame that extends along said lateral axis and is mounted to said pair of end brackets;
    an instrument panel support structure configured for locating said instrument panel assembly in a fore/aft direction and an up/down direction within the passenger compartment, said support structure including;
    a pair of lateral support brackets configured for attachment to a respective one of said pair of body panels;
    wherein each of said lateral support brackets presents a support surface defining an up/down datum feature;
    wherein each of said lateral support brackets includes a rear edge presenting a fore/aft datum feature;
    a pair of end brackets configured for attachment to a respective one of said ends of said instrument panel assembly;
    wherein each of said end brackets present a first edge and a projection extending from said first edge;
    wherein said first edge of each of said end brackets is configured to abut said up/down datum feature of said respective lateral support bracket to locate said instrument panel assembly in said up/down direction and said projection of each of said end brackets is configured to abut said fore/aft datum feature of said respective lateral support bracket to locate said instrument panel assembly in said fore/aft direction.

12. A mounting configuration, as set forth in claim 11, wherein said tubular support frame includes a main tube extending along said lateral axis between said opposing ends;
    wherein said pair of end brackets are attached to a respective one of said ends of said main tube such that said lateral axis extends through each of said end brackets.

13. A mounting configuration, as set forth in claim 11, further comprising at least one fastener interconnecting each of said pair of body panels with a respective one of said lateral support brackets.

14. A mounting configuration, as set forth in claim 11, further comprising at least one fastener interconnecting each of said pair of body panels with a respective one of said end brackets.

15. A method of locating an instrument panel assembly in a fore/aft direction and an up/down direction within a passenger compartment, said method comprising:
    providing a lateral support bracket presenting a support surface defining an up/down datum feature and including a rear edge presenting a fore/aft datum feature;
    providing an end bracket at an end of the instrument panel assembly;
    abutting a first edge of the bracket with the support surface of the up/down datum feature to locate the instrument panel assembly in the up/down direction;
    abutting a projection of the bracket with the rear edge of the fore/aft datum feature to locate the instrument panel assembly in the fore/aft direction;
    abutting a post of the lateral support bracket with a second surface of the end bracket to retain a portion of the end bracket between the post and the support surface.

16. A method, as set forth in claim 15, further comprising attaching the lateral support bracket to a body panel within the passenger compartment.

17. A method, as set forth in claim 15, further comprising attaching the end bracket to a body panel within the passenger compartment.

* * * * *